United States Patent
Matsubara et al.

(10) Patent No.: US 11,726,864 B2
(45) Date of Patent: Aug. 15, 2023

(54) DATA PROCESSING DEVICE AND DATA PROCESSING METHOD

(71) Applicant: RENESAS ELECTRONICS CORPORATION, Tokyo (JP)

(72) Inventors: Katsushige Matsubara, Tokyo (JP); Ryoji Hashimoto, Tokyo (JP); Takahiro Irita, Tokyo (JP); Kenichi Shimada, Tokyo (JP); Tetsuya Shibayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/821,915

(22) Filed: Mar. 17, 2020

(65) Prior Publication Data
US 2021/0294691 A1 Sep. 23, 2021

(51) Int. Cl.
*G06F 11/00* (2006.01)
*G06F 11/10* (2006.01)
*G06F 9/30* (2018.01)
*G06F 11/07* (2006.01)
*G06F 11/30* (2006.01)

(52) U.S. Cl.
CPC ...... *G06F 11/1004* (2013.01); *G06F 9/30189* (2013.01); *G06F 11/0772* (2013.01); *G06F 11/108* (2013.01); *G06F 11/3037* (2013.01)

(58) Field of Classification Search
CPC .............. G06F 11/1004; G06F 11/108; G06F 11/3037; G06F 11/0772; G06F 9/30189
See application file for complete search history.

(56) References Cited

U.S. PATENT DOCUMENTS

| | | | | |
|---|---|---|---|---|
| 8,042,023 B2* | 10/2011 | Balb | ................... | G06F 11/1004 714/768 |
| 8,522,004 B2* | 8/2013 | Borras | ................. | G06F 1/3275 713/189 |
| 8,555,116 B1* | 10/2013 | Shaeffer | .............. | G06F 11/0703 714/53 |
| 8,656,254 B2* | 2/2014 | Wang | .................... | H03M 13/29 714/763 |

(Continued)

FOREIGN PATENT DOCUMENTS

JP 2017-156984 A 9/2017

OTHER PUBLICATIONS

Extended European Search Report issued in corresponding European Patent Application No. 21162365.7-1224, dated Jul. 29, 2021.

*Primary Examiner* — Elmira Mehrmanesh
(74) *Attorney, Agent, or Firm* — McDermott Will & Emery LLP

(57) ABSTRACT

In a data processing device comprising a memory controller controlling writing/reading of data to/from the memory, a processor requesting writing/reading of data, and an error detection module requesting writing/reading of data to/from the memory controller in accordance with a request from the processor, an error detection module calculates a first error detection code of the first data having a write request from the processor, reads the second data having a read request from the processor from the memory, calculates a second error detection code from the read data, compares the first error detection code and the second error detection code, and transmits the result of the comparison to the external module.

5 Claims, 6 Drawing Sheets

(56) References Cited

U.S. PATENT DOCUMENTS

| | | | | |
|---|---|---|---|---|
| 8,862,825 B2* | 10/2014 | Kwon | ................... | G06F 15/16 |
| | | | | 711/119 |
| 8,954,676 B2* | 2/2015 | Han | ................... | G06F 12/0802 |
| | | | | 711/125 |
| 9,009,565 B1* | 4/2015 | Northcott | ........... | G06F 11/1012 |
| | | | | 714/763 |
| 9,239,752 B2* | 1/2016 | Lee | ................... | G06F 11/1004 |
| 10,078,541 B2* | 9/2018 | Benedict | ............ | G06F 11/1004 |
| 10,379,941 B2* | 8/2019 | Tsuboi | ................ | G06F 11/1044 |
| 10,423,488 B2* | 9/2019 | Asano | ................ | G06F 11/1076 |
| 10,922,165 B2* | 2/2021 | Nakazawa | .......... | G06F 11/1016 |
| 2006/0206769 A1* | 9/2006 | Klein | ................ | G06F 11/1052 |
| | | | | 714/E11.05 |
| 2007/0011562 A1* | 1/2007 | Alexander | .......... | G06F 11/1004 |
| | | | | 714/758 |
| 2011/0131381 A1* | 6/2011 | Kaplan | .............. | G06F 12/0875 |
| | | | | 711/E12.091 |
| 2013/0173767 A1* | 7/2013 | Nakamura | .......... | H04L 43/0876 |
| | | | | 709/222 |
| 2017/0123897 A1 | 5/2017 | Quach et al. | | |
| 2017/0255509 A1 | 9/2017 | Tsuboi et al. | | |
| 2018/0322002 A1* | 11/2018 | Wang | ................... | H03M 13/611 |
| 2019/0243566 A1* | 8/2019 | Hassan | ................ | G06F 3/0673 |
| 2019/0385689 A1* | 12/2019 | Jang | ................... | G11C 7/1006 |

* cited by examiner

DATA PROCESSING DEVICE AND DATA PROCESSING METHOD

BACKGROUND

The present invention relates to a data processing device and a data processing method.

In recent semiconductor systems, error detection and bit correction of data read from memory have been performed by using ECC (Error Correcting Code). Thus, the semiconductor system can improve reliability while suppressing an increase in the circuit scale as compared to the case of comparing their results by doubling the circuit configuration.

There is disclosed technique listed below.
[Patent Document 1] Japanese Unexamined Patent Application Publication No. 2017-156984

Patent Document 1 discloses techniques relating to ECCs. In device disclosed in Patent Document 1, the memory controller writes the data received from the CPU (Central Processing Unit) to the external memory when data is written, and writes the syndrome code created based on the data to the ECC memory. In addition, when the data is read, the memory controller reads the data stored in the external memory and reads the synchronization code of the data stored in the ECC memory. Thereafter, the memory controller performs error detection of the read data and bit correction, if possible, using its synchronous code.

FIG. 6 is a diagram illustrating the configuration of a prior art according to data processing device using ECC. In this prior art, 1-bit error correction and 2-bit error detection (Single Error Correction, Double Error Detection, hereinafter SECDED) are used as ECC. SECDED is a system suitable for systems in which operation can be continued by correcting if there is an error of 1 bit, and operation is stopped only when an error of 2 bits occurs.

The prior art data processing device includes a processor 61, a memory controller 62, and a DRAM (Direct Access Memory) 63. The processor 61 writes data to DRAM63 or reads data from DRAM63 through the memory controller 61. The processor 61 and the memory controller 62 are connected through a data bus (not shown). The detection of errors occurring on the data bus is performed by the error detection code generating unit (EDC61, EDC620, EDC621) and the error detection unit (EDU61, EDU62) included in the processor 61 and the memory controller 62, respectively. When an error is detected by the memory controller 62, the error correction unit EC performs error correction.

A request from the processor 61 generates a SECDED when the memory controller 62 writes data to DRAM63 and stores it in an area SECDED63 separate from the data area DATA63. On the other hand, upon request from the processor 61, when reading data from DRAM63, the corresponding SECDED together with the read data is read from SECDED63, detects or corrects errors.

SUMMARY

In the automotive field, a higher level of functional safety is required for the future popularization of automated driving. ASIL (Automotive Safety Integrity Level) is stipulated as the functional safety of ISO26262, and it is stipulated as QM (Quality Management)/ASIL-A/ASIL-B/ASIL-C/ASIL-D) from those with low safety levels. At ASIL-B level, more than 90% of failures occurring during operation must be detected, and at ASIL-D level, more than 99% must be detected. For example, in-vehicle electronic systems conforming to ISO26262, ASIL-D is required. Specifically, ASIL-D level of functional safety requires a high level of fault detection performance, called "Lock Step", that compares and matches the results obtained by two or more hardware operations.

However, in the prior art data processing device described above, the failure detecting mechanisms of the memory controller itself are insufficient, so that the memory controller remains ASIL-B as a functional safety level. Furthermore, when SECDED is used as an error correction code, if an error of 3 bits occurs, it may be judged as a correctable error of 1 bit, and as a result, it may be erroneously corrected to the wrong data and it may be regarded as no error. Therefore, the failure detection rate becomes ASIL-B levels. From the above, when the data processing device in the prior art is used in an on-board electronic system, the required levels of functional safety that functions accessing DRAM can satisfy are ASIL-B. In addition, even if the processors connected to the data processing device can meet the high ASIL requests alone, combining them with the prior art memory controllers eventually results in functional safety levels up to ASIL-B.

An object of the present invention is to meet the high ASIL requirements of the processor, even when combined with ASIL-B compliant memory controllers, by means of a processor and a data error detection module that meet the higher ASIL requirements. Other objects and novel features will become apparent from the description of the specification and drawings.

Means of Solving the Problems

In one embodiment according to data processing device, a processor that meets high ASIL requirements and the module allow the processor to meet high ASIL requirements, ASIL-C and ASIL-D, even when combined with a ASIL-B compliant memory controller. Therefore, by storing the CRC (cyclic redundancy check: Cyclic Redundancy Check) of the data to be stored in DRAM in this module, the data is protected by End-to-End from writing to reading, and the path including the memory controller and DRAM can have a failure detection rate that satisfies ASIL-D.

It has mechanisms for detecting faults in the module with a coverage rate that satisfies high ASIL levels. For example, by duplicating the entire module, it is possible to have a fault detecting rate that satisfies ASIL-D. If high ASIL levels can be met, it is not limited to redundant. The data bus between the processor and the module can also have a fault detection rate that meets ASIL-D, in conjunction with an appropriate error detection code. If the size of the memory controller is larger than that of the module, ASIL-C or ASIL-D functional safety requirements can be met at less costs of increasing ASIL level of the memory controller.

DETAILED DESCRIPTION

Figure 1:
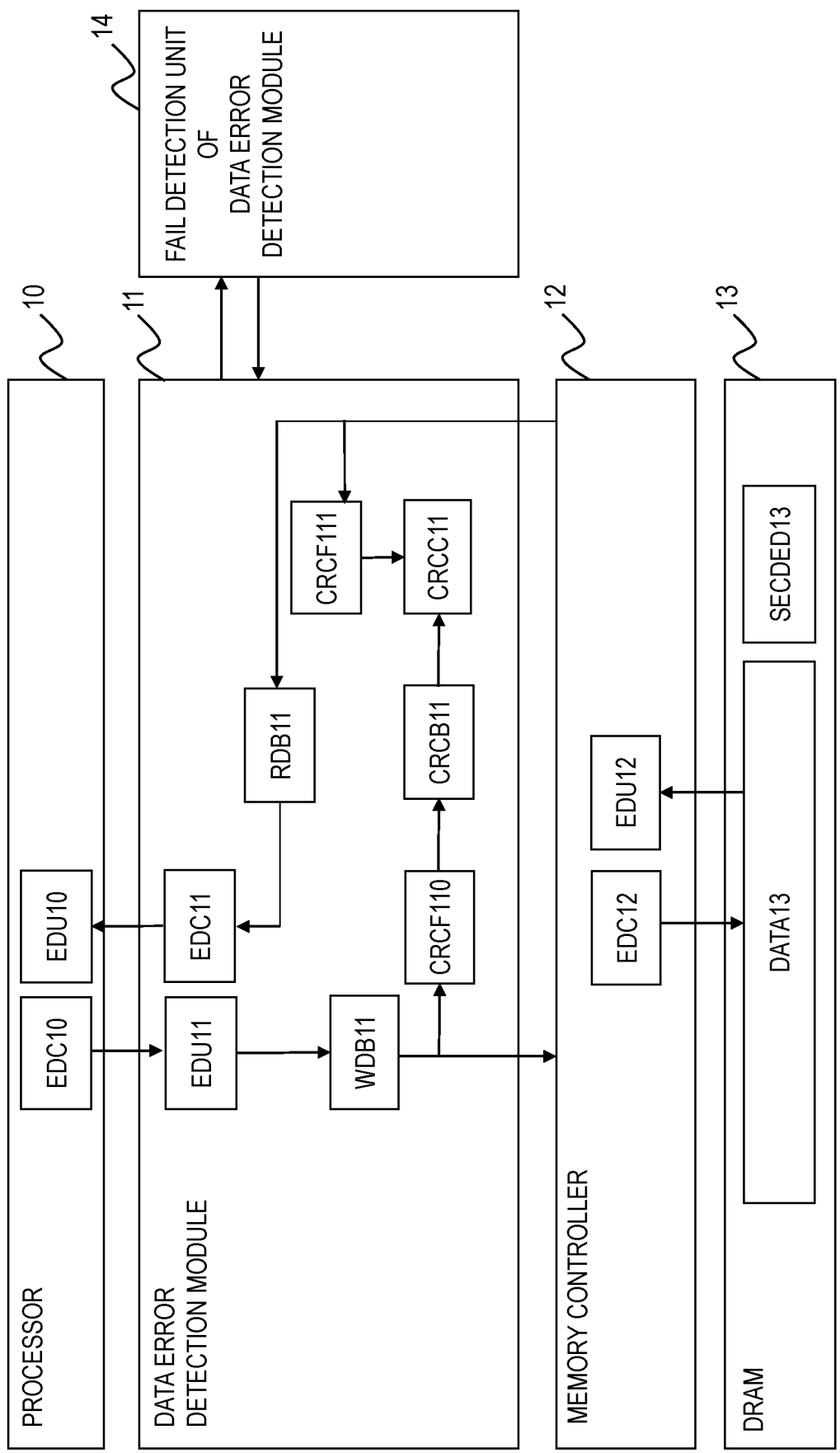
FIG. 1 is a block diagram illustrating the configuration of the first embodiment according to data processing device.

Hereinafter, a semiconductor device according to an embodiment will be described in detail by referring to the drawings. In the specification and the drawings, the same or corresponding form elements are denoted by the same reference numerals, and a repetitive description thereof is omitted. In the drawings, for convenience of description, the configuration may be omitted or simplified. Also, at least some of the embodiments and each modification may be arbitrarily combined with each other.

First Embodiment

FIG. 1 is a block diagram illustrating the configuration of the first embodiment according to data processing device.

As shown in FIG. 1, it has a processor 10, a data error detection module 11, a memory controller 12, a DRAM13, and a failure detection unit of a data error detection module 14. The processor 10 processes the data read from DRAM13 and writes the processing result data to DRAM13. The processor 10 is connected to the data error detection module 11 and makes a data write/read request to DRAM13 to the data error detection module 11. The data error detection module 11 is connected to the processor 10, the memory controller 12, and the failure detection unit of the data error detection module 14, and sends a write/read request to DRAM13 from the processor 10 to the memory controller 12. The data written to DRAM13 and the data read from DRAM13 are compared to each other, and if they do not match, it is determined that an error has occurred in any of the data error detection modules 11 to the memory controller 12 to DRAM13, and an error occurrence is conveyed to the failure detection unit 14 of the data error detection module. The memory controller 12 is connected to the data error detection module 11 and DRAM13, and writes/reads data to/from DRAM13 in response to a request from the data error detection module 11. The processor 10, the data error detection module 11, and the memory controller 12 each have an error detection code generation unit (EDC10, EDC11, EDC12) and an error detection unit (EDU10, EDU11, EDU12). When the processor 10 executes a data write request, the error detection code is added to the data in the error detection code generation unit (EDC10), the error detection code added by the error detection unit (EDU10) when the data is read is inspected, if an error occurs, the error correction is performed. Similar processing is also performed in the data error detection module 11 and the memory controller 12. The data error detection module 11 further includes a write data storage unit (WDB11) for temporarily storing data for which write requests to DRAM13 were issued from the processor 10, a read data storage unit (RDB11) for temporarily storing data read from DRAM13, two CRC function units (CRCF110,CRCF111) for calculating the CRC of data, a CRC buffer (CRCB11) for storing the CRC calculated by the CRC function unit (CRCF10), and a CRC comparison unit (CRCC11) for comparing the CRC calculated at the time of data writing and the CRC calculated at the time of data reading. DRAM13 has a data storage unit (DATA13) for storing data and a SECDED code storage unit (SECDED13) for storing SECDED codes. The failure detecting unit of the data error detecting module 14 performs processing when an error is detected by the data error detecting module 11. With such a configuration, the data processing device meets the requirements of high ASIL levels, e.g., ASIL-C/ASIL-D, for fault detection rates.

Operation of Data Processing Device

The data error detection module 11 receives a data write request to DRAM13 from the processor 10 and stores the data in the write data storage unit (WDB11). The CRC function unit (CRCF110) generates a CRC from the data to be written, calculates the write address of the CRC buffer (CRCB11) from DRAM13 write address, and stores it in the calculated address.

When the data is read from DRAM13, when the data error detection module 11 receives a data read request from the processor 10, the CRC function unit (CRCF111) generates the CRC from the read data and compares it with the CRC read from the CRC buffer (CRCB11) corresponding to the read address of DRAM13 by the CRC comparison unit (CRCC11).

As a result of comparing the CRCs, it is determined that there is no error if there is a match, and it is determined that there is an error if there is a mismatch, and the determination result is sent to the failure detection unit of the data error detection module 14. When there is an error, the failure detection unit of the data error detection module 14 performs predetermined operations such as outputting a warning message and stopping the function.

According to the first embodiment according to data processing device, the processor can meet the high ASIL requirements, ASIL-C, and ASIL-D, even when combined with a ASIL-B compatible memory controller, by a processor that meets the high ASIL requirements and the data error detection module. The reason is that the CRCs of the data stored in DRAM are stored in the module so that the CRCs are protected by End-to-End from writing data to lead data, and that the CRCs have a high failure detection rate that satisfies ASIL-D in the path including the memory controller and DRAM.

Further, since it has a failure detection unit of the data error detecting module 14, it is possible to satisfy the high ASIL level of the failure detection rate, for example, ASIL-C/ASIL-D requirements. In addition, ASIL-D with high failure detecting rate can be satisfied by duplicating the whole modules. Incidentally, if it is possible to satisfy the high ASIL levels, it is not limited to the redundancy of the modules. In addition, the data bus between the processor and the modules can also have a fault detection rate that meets ASIl-D by combining with appropriate error detection mechanisms. As an example of an error detection mechanism, there is a lock step of the data bus or a method of giving an error detection code to the signal flowing through the data bus.

Second Embodiment

Figure 2:
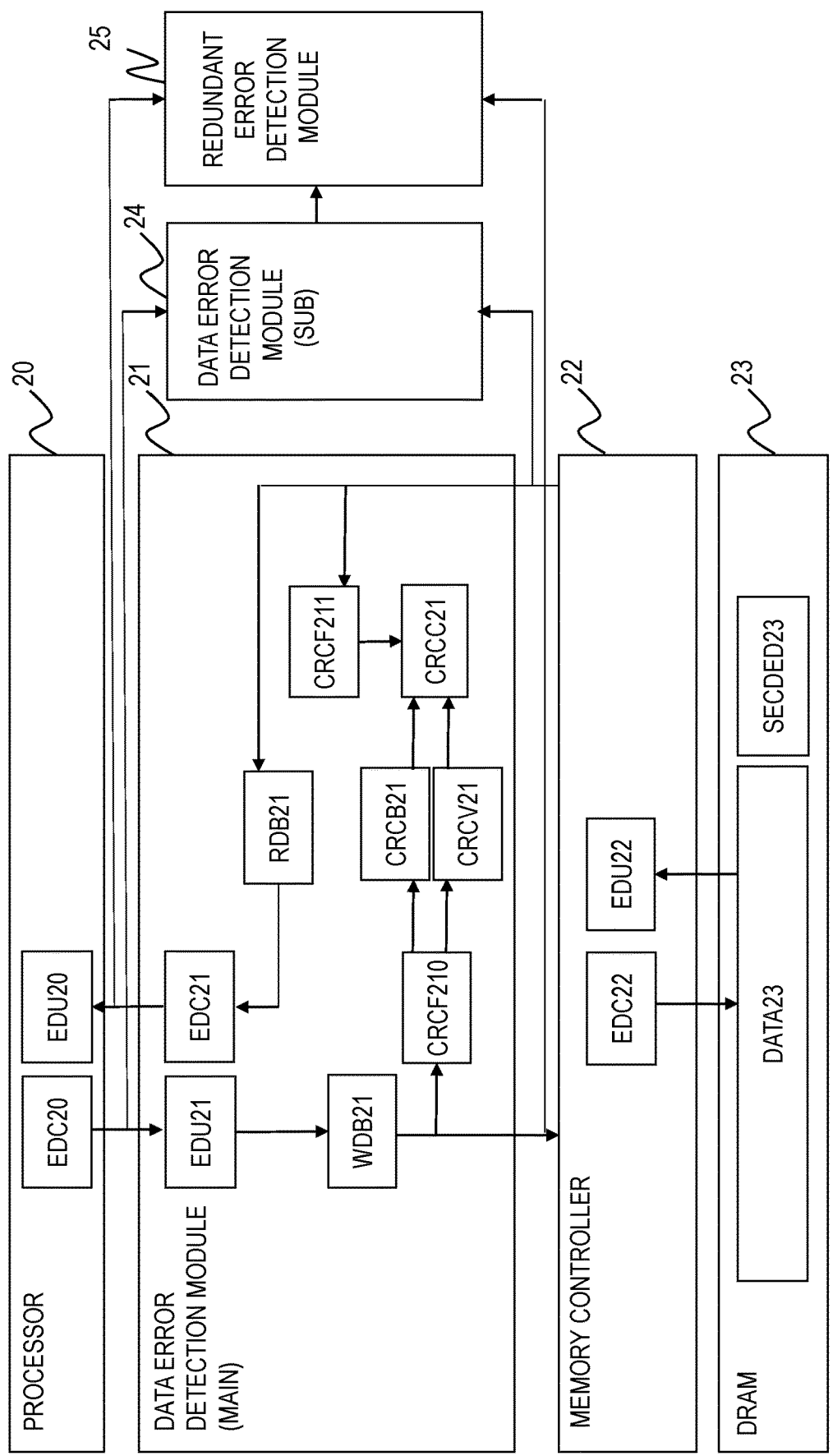
FIG. 2 is a block diagram illustrating the configuration of the second embodiment according to data processing device.

FIG. 2 is a block diagram illustrating the configuration of the second embodiment according to data processing device.

As shown in FIG. 2, it has a processor 20, a data error detection module (main) 21, a memory controller 22, a DRAM23, and a data error detection module (sub) 24. The processor 20, the data error detection module (main) 21, the memory controller 22 has an error detection code generating unit (EDC20, EDC21, EDC22) and an error detecting unit (EDU20, EDU21, EDU22), respectively. The data error detection module (main) 21 further has a write data storage unit (WDB21) and the read data storage unit (RDB21), two CRC function unit (CRCF210, CRCF211), CRC buffer (CRCB21), CRC comparison unit (CRCC21), a CRC valid flag (CRCV21). DRAM23 has a data storage unit (DATA23) and a SECDED code storage unit (SECDED23).

The data processing device according to the second embodiment differs from the first embodiment in that the data error detection module (main) 21 has a CRC valid flag (CRCV21). The CRC valid flag (CRCV21) indicates whether it is 1 (valid) or (invalid) for each address of the CRC buffer (CRCB21). When the CRC valid flag (CRCV21) is 1 (valid), it indicates that CRC is stored in the corresponding CRC buffer (CRCB21).

Further, the data error detection module is redundant, and is composed of a data error detection module (main) 21 and the data error detection module (sub) 24, different from the first embodiment in that it further has a redundant error detection module 25 for comparing the data both output. Although the configuration of the data error detection module (sub) 24 is not shown, it is the same as the data error detection module (main) 21. Incidentally, if it is possible to configure a fault detecting system that satisfies the requirements of high ASIL levels, other methods may be used, not limited to the redundant.

Operation of Data Processing Device

Next, an operation example of the second embodiment according to data processing device will be described. The data error detection module (main) 21 receives data write requests from the processor 20 to DRAM23 and stores them in the write data storage unit (WDB21). The CRC function unit (CRCF210) generates a CRC from the data to be written, calculates the write address of the CRC buffer (CRCB21) from DRAM23 write address, stores it in the calculated write address, and sets the CRC valid flag corresponding to the write address to 1 (valid).

On the other hand, when data is read from DRAM23, when the data error detection module (main) 21 receives a data read request from the processor 20, the CRC function unit (CRCF211) generates a CRC from the read data and compares it with the CRC read from the CRC buffer (CRCB21) corresponding to the read address of DRAM23 by the CRC comparison unit (CRCC21). However, comparison is not performed when the CRC valid flag corresponding to the read address is 0 (disabled).

As a result of comparing the CRC, it is determined that there is no error in the case of coincidence, and that there is an error in the case of mismatch, and the determination result is sent to a failure detection unit of a data error detection module (main) 21(not shown). The failure detection unit of a data error detection module performs a predetermined operation, such as output of a warning message or stop of a function, when there is an error. The data error detection module (sub) 24 receives the same input as the data error detection module (main) 21. The redundant error detection module 25 always performs a comparative of the data error detection module (main) 21 and (sub) 24, and when detecting a discrepancy, it is determined that a failure has occurred inside the module.

According to the second embodiment according to data processing device, even when combined with an ASIL-B compatible memory controller, the data generated by a high ASIL level (ASIL-C or ASIL-D) processor can be stored on DRAM while maintaining ASIL level.

Furthermore, when the CRC valid flag (CRCV21) is 0 (disabled), no CRC has been generated, indicating that no valid ASIL-C/ASIL-D of data has yet been stored in the area of the corresponding DRAM23. When the CRC reads the data written by a module other than the data error detection module, the corresponding CRC does not exist, so it is erroneously judged as an error when a CRC judgment is made. By providing the CRC valid flag, it is possible to prevent misjudgment as an error when DRAM is read, and it is possible to notify the processor of the information that the not stored area has been accessed.

Third Embodiment

Figure 3:
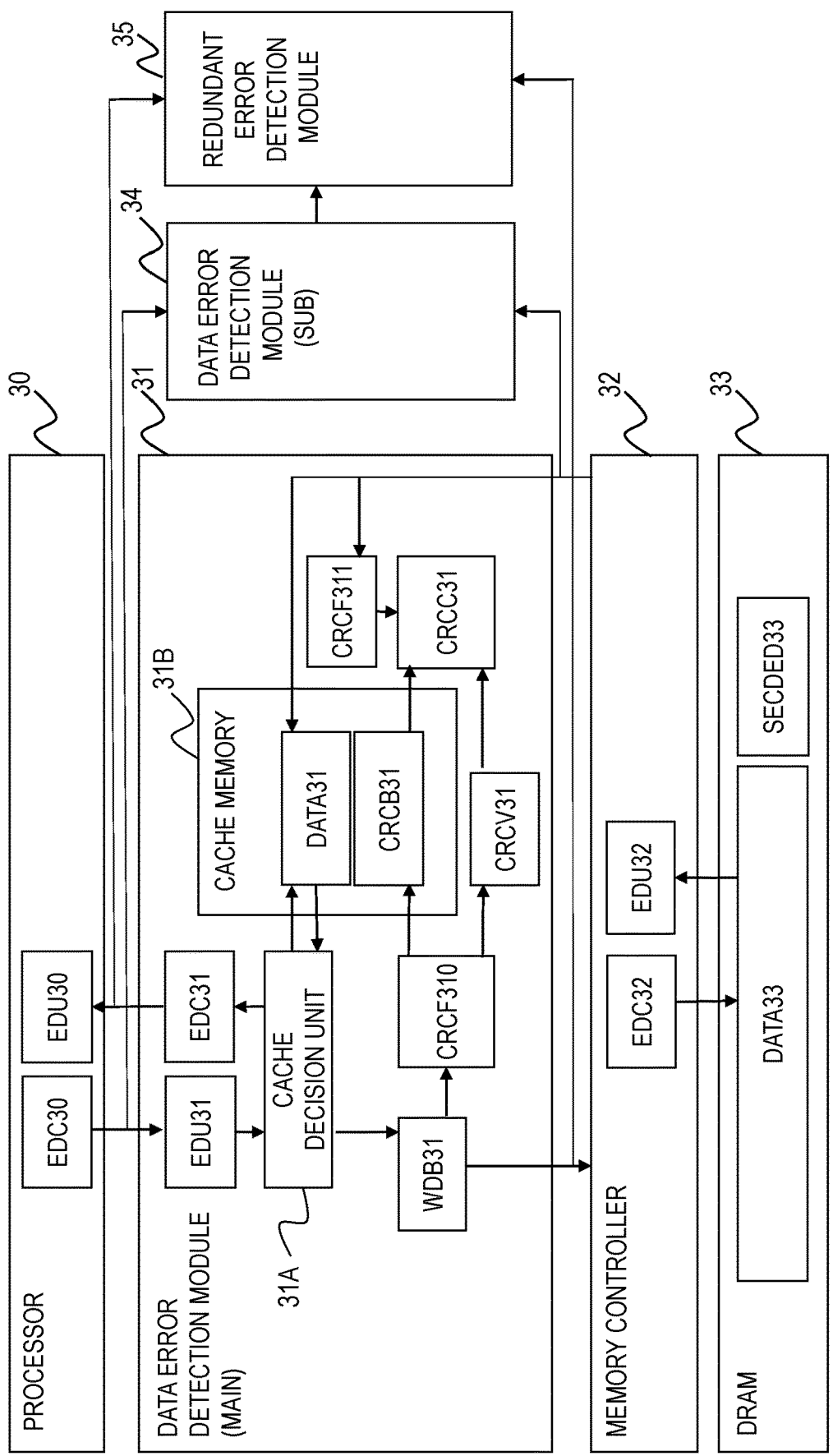
FIG. 3 is a block diagram illustrating the configuration of a third embodiment according to data processing device.

FIG. 3 is a block diagram illustrating the configuration of a third embodiment according to data processing device.

As shown in FIG. 3, it has a processor 30, a data error detection module (main) 31, a memory controller 32, a DRAM33, and a data error detection module (sub) 34. The processor 30, the data error detection module (main) 31, the memory controller 32 has an error detection code generating unit (EDC30, EDC31, EDC32) and an error detection unit (EDU30, EDU31, EDU32), respectively. Data error detection module (main) 31 further has a write data storage unit (WDB31), two CRC function unit (CRCF310,CRCF311), CRC comparison unit (CRCC31), a CRC valid flag (CRCV31). DRAM33 has a data storage unit (DATA33) and a SECDED code storage section (SECDED33).

The third embodiment differs from the second embodiment in that the cache determination unit 31A and the cache memory 31B are provided. In addition, the cache memory 31B has a data section (DATA31) for cache and a CRC buffer (CRCB31) for storing the CRC calculated by the CRC operation section (CRCF310).

The position to store the CRC calculated in the CRC buffer (CRCB31) is uniquely determined by the storage addresses of DRAM of the corresponding data. The CRC valid flag (CRCV31) indicates whether the CRC in the CRC buffer (CRCB31) is valid or invalid. The size of the area of the CRC buffer (CRCB31) and the area of the data section (DATA31) on the cache memory can be changed.

The data error detection module is redundant, and each output of the data error detection module (main) 31 and the data error detection module (sub) 34 is compared for each predetermined cycle to detect the failure of the module itself. It has an error detection code generation and detection circuit for detecting a fault occurring on the data bus between the processor 30 and the error data detection module (main) 31.

The cache memory 31B of the data error detection module (main) 31 operates as an external cache memory of the processor 30. A request for accessing DRAM33 from the processor 30 is received, and when the corresponding data exists in the data section (DATAB31) of the cache memory 31B, data is transferred between the processor 30 and the cache memory 31B. When the corresponding data does not exist in the data unit (DATAB31) of the cache memory 31B, the cache determination circuit 31A transfers the corresponding data between DRAM33 and the cache memory 31B.

When data is transferred between the cache memory 31B and DRAM33, for data write, the CRC of the write data is calculated by the CRC function unit (CFCF310), the calculated CRC is stored at a position corresponding to the write address of DRAM33 of the CRC buffer (CRCB31), and the corresponding CRC valid flag is set to 1 (enabled).

On the other hand, when data is read from DRAM33, when the data error detection module (main) 31 receives a data read request from the processor 30, the CRC function unit (CRCF311) generates a CRC from the read data and compares it with the CRC read from the CRC buffer (CRCB31) corresponding to the read address of DRAM33 by the CRC comparison unit (CRCC31). However, comparison is not performed when the CRC valid flag corresponding to the read address is 0 (disabled).

According to according to data processing device of the third embodiment, the sizes of the data portion and the CRC buffer of the cache memory can be changed according to the required levels of functional safety. When a large ASIL-C/ASIL-D of data layer is required, it can be realized by reducing the area of the data part of the cache memory and increasing the area of the CRC buffer. Conversely, if there is no need for a large ASIL-C/ASIL-D of data areas, the performance of the cache memory can be improved by reducing the area of the CRC buffer of the cache memory and increasing the area of the data section.

Fourth Embodiment

Figure 4:
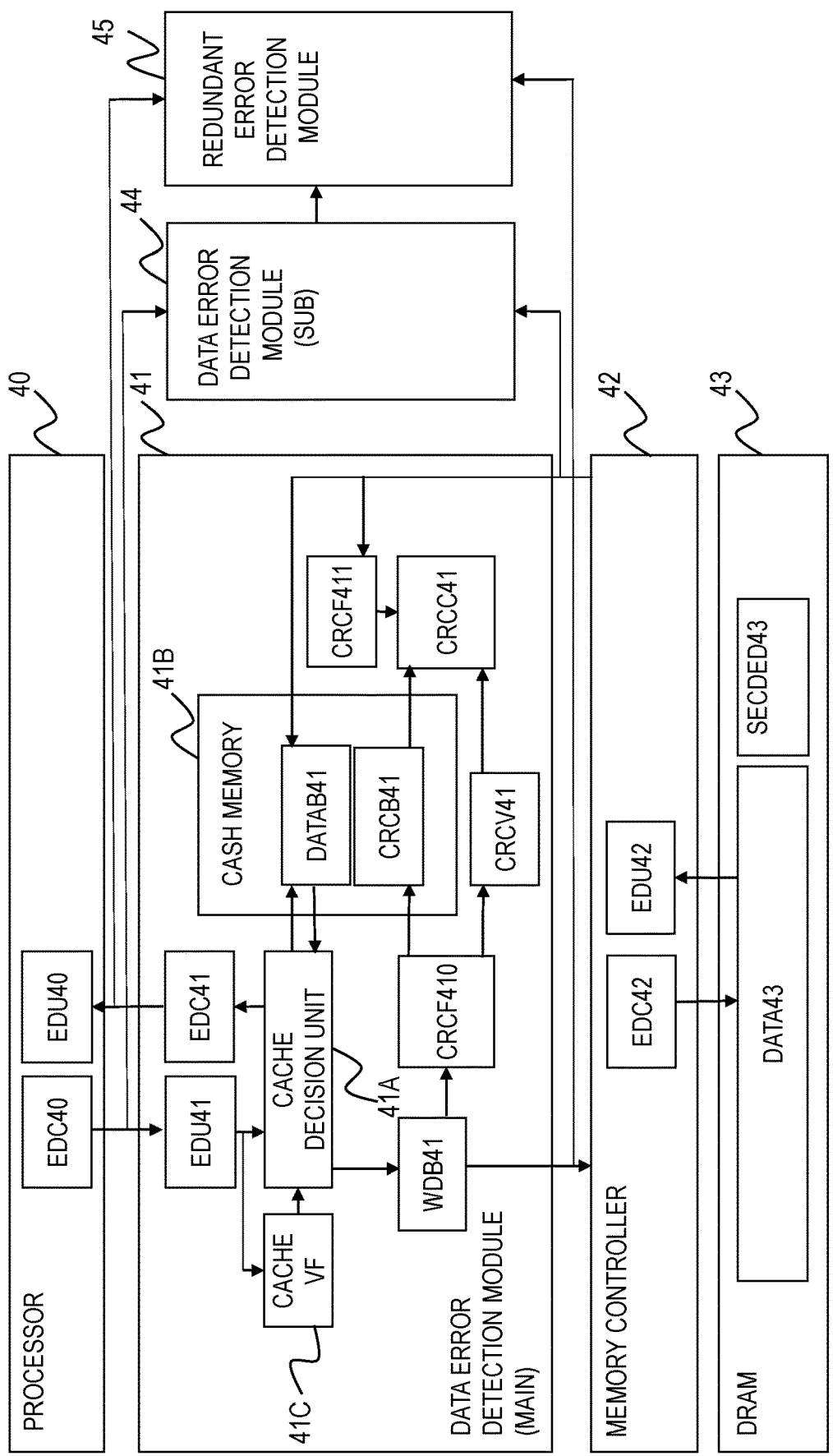
FIG. 4 is a block diagram illustrating the configuration of the fourth embodiment according to data processing device.

FIG. 4 is a block diagram illustrating the configuration of the fourth embodiment according to data processing device.

As shown in FIG. 4, it has a processor 40, a data error detection module (main) 41, memory controller 42, DRAM43, and data error detection module (sub) 44. The processor 40, the data error detection module (main) 41, the memory controller 42 has an error detection code generating unit (EDC40, EDC41, EDC42) and an error detecting unit (EDU40, EDU41, EDU42), respectively. The data error detection module (main) 41 further has a write data storage unit (WDB41), two CRC function unit (CRCF410, CRCF411), CRC comparison unit (CRCC41), a CRC valid flag (CRCV41). DRAM43 has a data storage unit (DATA43) and a SECDED code storage section (SECDED43).

As in the third embodiment, the cache determination unit 41A and the cache memory 41B are provided, and the cache memory 41B has a data storage unit (DATAB41) for the cache and a CRC buffer (CRCB41) for storing the CRC calculated by the CRC function unit (CRCF410). It differs from the third embodiment in that the cache valid flag 41C is provided, and the CRC valid flag is also used for cache determination.

When the cache valid flag 41C is 0 (invalid), the processor 40 can be used as a scratchpad memory, in which all data on the cache memory 41B is a temporary buffer. When the cache valid flag 41C is 1 (valid), the cache function is enabled. After the cache function is enabled, the cache determination circuit 41A uses the CRC valid flag 41C to determine whether the CRC storage buffer (CRCB41) is still available as scratchpad memory.

When the cache valid flag 41C is 0 (invalid), the cache determination circuit 41A uses the entire cache memory 41B as a scratchpad memory so that it can be read and written from the processor 40. When the cache valid flag 41C is set to 1 (valid) by the processor 40, the cache determination circuit 41A starts processing as an external cache of the processor 40. At switching, all CRC valid flags are set to 0 (invalid).

After switching, all data in the data section (DATAB41) on the cache memory 41B is treated as filled in the cache line. The data in the CRC buffer (CRCB41) is used as scratchpad memory while the corresponding CRC valid flag (CRCV41) is 0 (disabled). When a write-back occurs to DRAM43 and a CRC is generated, the data is retracted to DRAM43 and switched from the scratchpad memory to the CRC buffer (CRCB41).

Figure 5:
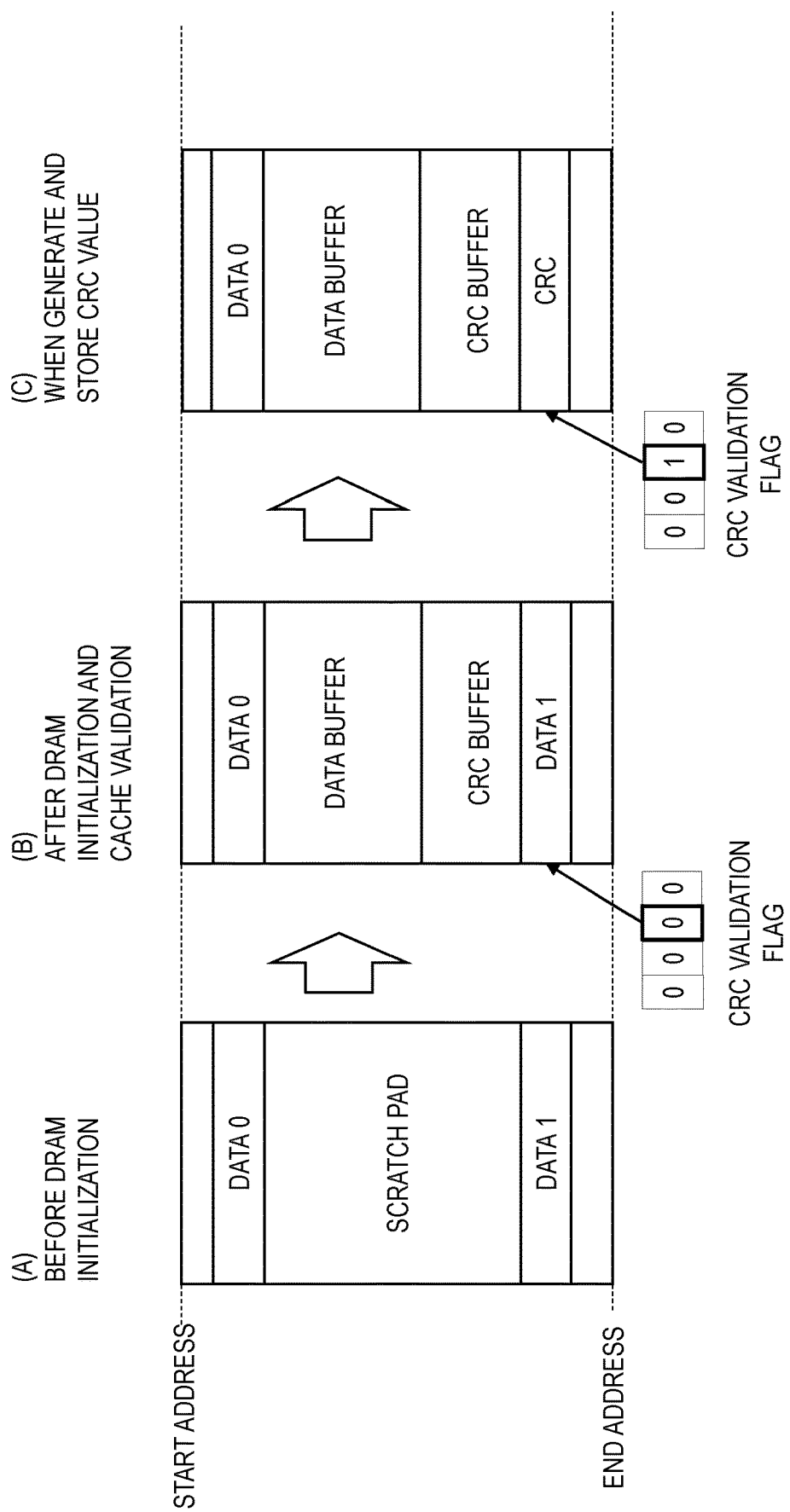
FIG. 5 is a diagram illustrating a flow of switching the buffer area in the third embodiment according to data processing device.
Figure 6:
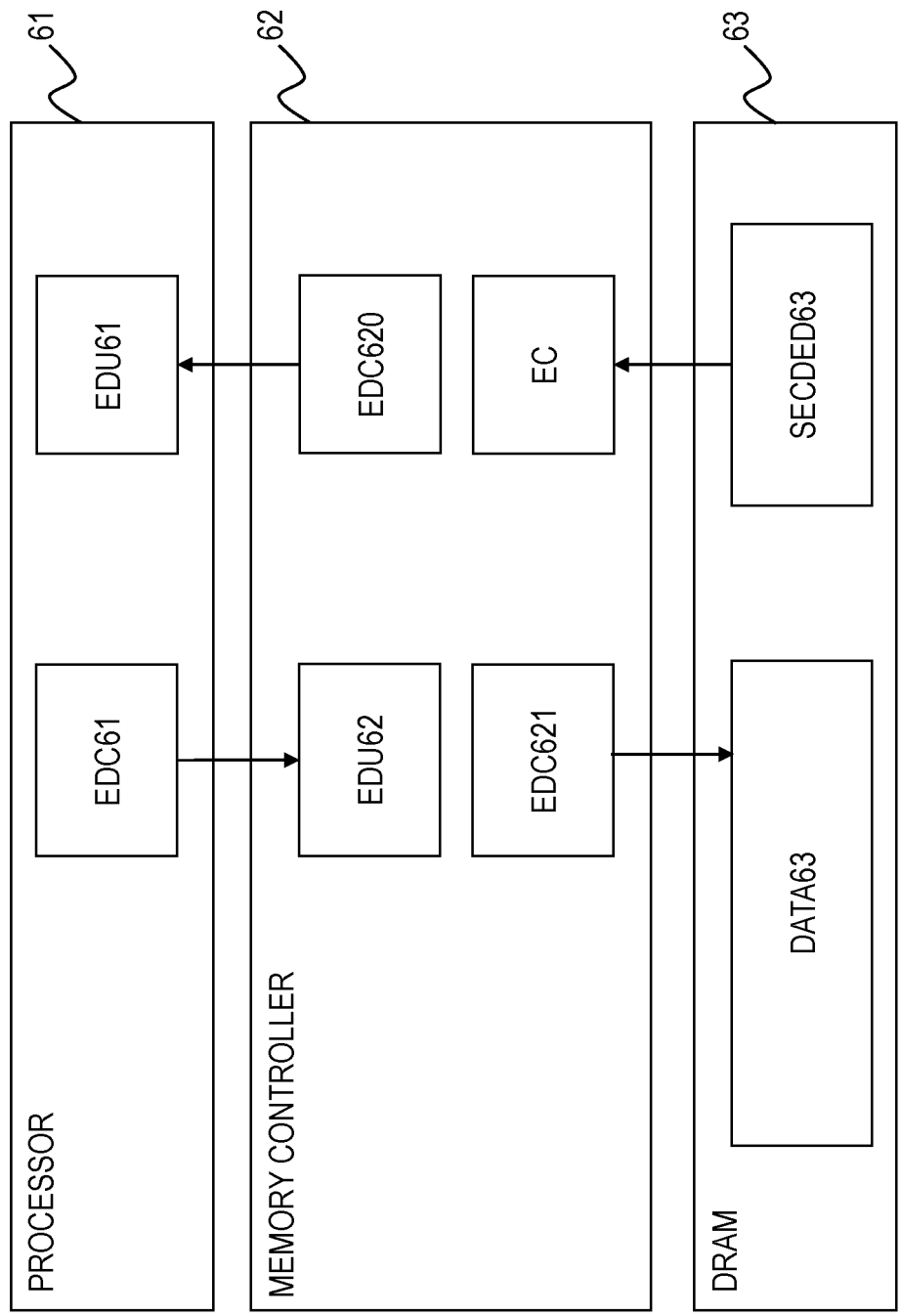
FIG. 6 is a block diagram illustrating the configuration of the prior art according to data processing device.

FIG. 5 is a diagram for explaining the switching of the buffer area. (A) When DRAM is still unavailable, the entire cache memory can be used as a scratchpad memory that meets high ASIL levels by setting the cache valid flag to 0 (invalid). (B) After DRAM becomes available, the cache valid flag can be set to 1 (valid) at the processor's timing and switched for use as a cache. (C) indicates a state in which a CRC is generated and stored in a buffer.

By using the CRC value valid flag for cache judgment, it is possible to dynamically switch from the scratchpad memory to the CRC value buffer area. Thus, even after the cache function is enabled, the data stored in the scratchpad memory can be used as it is.

Cache memory can be used as a storage area for starting programs, etc., when DRAM is not valid, such as at LSI startup. Since the data can be retained even after DRAM is enabled, the processor can switch the process to a program corresponding to functional safety without interruption from the start program.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

What is claimed is:

1. A data processing device comprising:
  a processor;
  a dynamic random access memory (DRAM) whose data is protected by cyclic redundancy check (CRC);
  a memory;
  an error detection code generation unit (EDC);
  an error detection unit (EDU);
  first and second CRC function units; and
  a flag,
  wherein when the flag indicates a first mode:
    the processor uses the memory as a cache memory for the DRAM when the processor accesses the DRAM;
    data between the processor and the cache memory is protected by both the EDC and the EDU; and
    data between the cache memory and the DRAM is protected by the first and second CRC function units,
  wherein when the flag indicates a second mode:
    the memory operates as a scratchpad memory and not as a cache memory, and the processor accesses the scratchpad memory without accessing the DRAM; and
    data between the processor and the scratchpad memory is protected by both the EDC and the EDU,
  wherein the memory stores a program for the processor, and
  wherein the processor executes the program stored on the memory when the flag indicates the second mode.

2. The data processing device according to claim 1, wherein data stored in the cache memory is transferred to the DRAM by a write back when the flag indicates the first mode, and
  Wherein the data transferred to the DRAM by the write back is protected by the EDC and the EDU.

3. The data processing device according to claim 1, wherein the data stored in the memory is retained when the second mode is switched to the first mode.

4. A data processing device comprising:
  a processor;
  a dynamic random access memory (DRAM) whose data is protected by cyclic redundancy check (CRC);
  a memory;
  an error detection code generation unit (EDC);
  an error detection unit (EDU);
  first and second CRC function units; and a flag,
wherein when the flag indicates a first mode:
the processor uses the memory as a cache memory for the DRAM when the processor accesses the DRAM;
data between the processor and the cache memory is protected by both the EDC and EDU; and
data between the cache memory and DRAM is protected by the first and second CRC function units,
wherein when the flag indicates a second mode:
the memory operates as a scratchpad memory and not as a cache memory, and the processor accesses the scratchpad memory without accessing the DRAM; and
data between the processor and the scratchpad memory is protected by both the EDC and EDU.

5. The data processing device according to claim 4, wherein data stored in the cache memory is transferred to the DRAM by a write back when the flag indicates the first mode, and
wherein the data transferred to the DRAM by the write back is protected by the EDC and EDU.

\* \* \* \* \*